(12) United States Patent  
Foti

(10) Patent No.: US 8,056,055 B1
(45) Date of Patent: Nov. 8, 2011

(54) OBJECT MANAGEMENT USING CYCLIC PATH INFORMATION

(75) Inventor: David A. Foti, Tolland, CT (US)

(73) Assignee: The MathWorks, Inc., Natick, MA (US)

( * ) Notice: Subject to any disclaimer, the term of this patent is extended or adjusted under 35 U.S.C. 154(b) by 821 days.

(21) Appl. No.: 12/135,403

(22) Filed: Jun. 9, 2008

Related U.S. Application Data

(63) Continuation-in-part of application No. 11/810,445, filed on Jun. 5, 2007, now abandoned, which is a continuation of application No. 09/912,720, filed on Jul. 24, 2001, now Pat. No. 7,237,237.

(51) Int. Cl.
*G06F 9/44* (2006.01)
*G06F 9/45* (2006.01)

(52) U.S. Cl. ........ 717/116; 717/140; 717/141; 717/151; 717/154; 717/156

(58) Field of Classification Search .................. None
See application file for complete search history.

(56) References Cited

U.S. PATENT DOCUMENTS

| | | | |
|---|---|---|---|
| 6,363,403 B1 * | 3/2002 | Roy et al. ................. | 1/1 |
| 6,381,738 B1 | 4/2002 | Choi et al. | |
| 6,502,110 B1 | 12/2002 | Houldsworth | |
| 6,526,422 B1 | 2/2003 | Flood et al. | |
| 6,675,379 B1 | 1/2004 | Kolodner et al. | |
| 6,701,334 B1 | 3/2004 | Ye et al. | |
| 6,757,890 B1 | 6/2004 | Wallman | |
| 6,760,825 B1 | 7/2004 | Sexton et al. | |
| 6,845,385 B1 * | 1/2005 | Hennessey ............... | 1/1 |
| 7,107,426 B2 * | 9/2006 | Kolodner et al. ......... | 711/170 |
| 7,620,943 B1 * | 11/2009 | Garthwaite ............... | 717/140 |
| 2003/0191783 A1 * | 10/2003 | Wolczko et al. ......... | 707/206 |
| 2004/0123048 A1 * | 6/2004 | Mullins et al. ........... | 711/141 |
| 2004/0181562 A1 * | 9/2004 | Findeisen ................ | 707/206 |
| 2004/0181782 A1 * | 9/2004 | Findeisen ................ | 717/130 |
| 2004/0187102 A1 * | 9/2004 | Garthwaite ............... | 717/160 |
| 2007/0162527 A1 * | 7/2007 | Wright et al. ............ | 707/206 |
| 2007/0180215 A1 * | 8/2007 | Cascaval et al. ......... | 711/202 |
| 2008/0235309 A1 * | 9/2008 | Bacon et al. ............. | 707/206 |
| 2010/0180090 A1 * | 7/2010 | Click et al. ............. | 711/159 |

* cited by examiner

*Primary Examiner* — Insun Kang

(74) *Attorney, Agent, or Firm* — Nelson Mullins Riley & Scarborough LLP

(57) ABSTRACT

A mechanism controls disposition of a candidate object in an object-oriented programming environment. The mechanism identifies cyclic information related to an object being considered for destruction and determines based on that information whether the candidate object is externally unreachable and can therefore be destroyed. The cyclic information may be stored for repeated use.

23 Claims, 11 Drawing Sheets

OBJECT MANAGEMENT USING CYCLIC PATH INFORMATION

RELATED APPLICATION

This application is a continuation-in-part of U.S. patent application Ser. No. 11/810,445, now abandoned, filed Jun. 5, 2007 which is a continuation of U.S. patent application Ser. No. 09/912,720, filed Jul. 24, 2001 (now U.S. Pat. No. 7,237,237 granted Jun. 26, 2007). The contents of both applications are hereby incorporated by reference in their entirety.

BACKGROUND INFORMATION

In an object-oriented programming environment, a user may create objects that interact with other objects in the environment. Each object in the environment can consume system resources. Examples of such system resources include memory, sockets, and file handles. When an object is no longer needed by the system, an object may be destroyed to free any system resources consumed by that object.

BRIEF DESCRIPTION OF THE DRAWINGS

FIGS. 4A-4J depict stages during an exemplary examination of a directed graph by an embodiment;

DETAILED DESCRIPTION

Overview

Figure 1A:
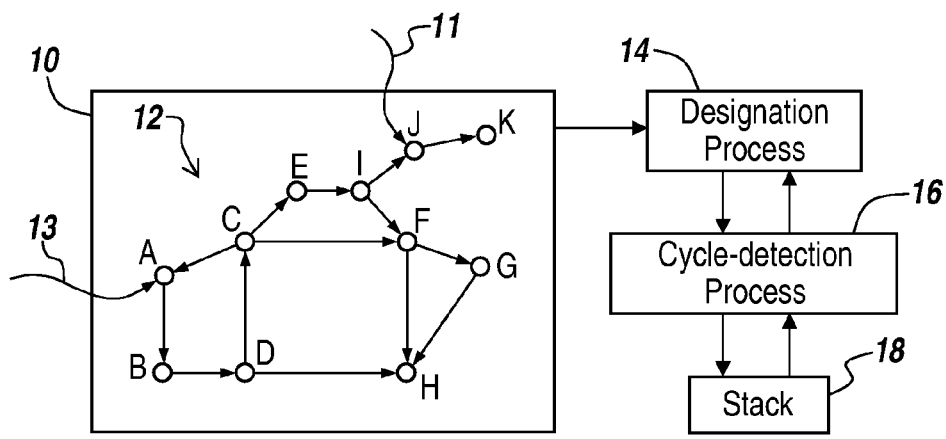
FIG. 1A depicts an exemplary directed graph representative of an object oriented programming environment.

In an object-oriented programming environment, an object may be referred to or referenced by other entities in the object-oriented environment. A reference by one entity to another in the object-oriented environment can indicate that the two entities are associated in some manner. For example, one object may contain a property or field that contains a reference to another object. Such a reference can be referred to as an internal reference. Alternatively, a reference to an object may be made by something other than an object. For example, a reference to an object may originate from a local variable or a global variable. References to an object that do not originate from another object may be referred to as external references.

When a reference to an object is deleted, it is possible to destroy the object that was referred to. U.S. Pat. No. 7,237,237 describes a process for separately accounting for internal references and external references to an object. The separate accounting of internal and external references to an object allows for automatically designating the referenced object for destruction or preservation when the reference to the object is destroyed. Exemplary embodiments of the present invention improve upon the system described in U.S. Pat. No. 7,237,237. The exemplary embodiment may reuse information gathered while processing objects to determine whether the objects should be destroyed or preserved. The reuse of the gathered information can reduce or limit the amount of processing needed to manage the objects in the object-oriented environment.

Object Management

Problems may arise when an attempt is made to destroy an object. These problems may arise from the manner in which objects are linked to each other as the objects may be linked by an indirect reference. For example, a first object may refer to a second object. If the first object is to be destroyed then the second object may also be destroyed when no other object in the environment interacts with the second object. However, when another other object in the environment interacts with the second object, then the second object should not be destroyed.

A de-allocation process may be used to examine objects in an object-oriented environment to determine whether destruction of a particular object, or the severing of a link between two objects, should trigger destruction of one or more other objects. Conventional de-allocation processes may become inefficient when the number of objects and/or the number of links between objects increases. In some cases, this inefficiency can be manifested as unacceptably long times required to perform the de-allocation. Attempting to shorten this time by applying additional processing resources to the de-allocation can become unacceptably expensive. Exemplary embodiments described herein can be configured to perform destruction analyses efficiently as compared to conventional techniques.

In an embodiment, destruction analysis can be performed in a block diagram environment used for simulating a dynamic system. In a block diagram environment, each block may represent a transfer function of a constituent element of the dynamic system. In this environment, each block can be implemented as an object that is linked to one or more other blocks. When a first block is removed from the system, a second block in communication with that first block may be removed if no other block is linked to that second block.

In object-oriented environments, a class provides a definition for members of that class. The members of the class are conventionally referred to as objects or instances belonging to the class. Each object of a class includes properties and methods/functions as specified in the definition of the class. The class properties for an individual object may also be referred to as state variables, data members, fields, etc. In creating an object, values are provided for the properties. One way to provide a value for a property is to provide a reference to a second object from a first object. As mentioned above, a reference which points from the first object to the second object can be referred to as an internal reference.

In the example above, a second object may also include an internal reference to a third object. The third object, in turn, may have an internal reference to a fourth object, and so on. In some cases, an object might refer back to an earlier object from which it was referenced either directly or indirectly. For example, the fourth object may have a property value that refers to the first object.

Directed Graphs

The relationship of objects within an object-oriented environment as described above can be modeled as a directed graph (also referred to as a "digraph"). FIG. 1A depicts an exemplary directed graph 12 representative of an object oriented programming environment 10 (hereafter "environment 10"). Digraph 12 includes several nodes A-K, which represent objects. The terms "node" and "object" are used interchangeably throughout this specification. Links connect the nodes to each other. The links also are referred to as references to and from an object. Thus, an arrow from a first object to a second object in a depiction of the directed graph indicates that the first object refers to the second object. These references are internal references because the references represent interactions between objects. In contrast, local variables refer to nodes A and J in FIG. 1A. Nodes A and J are said to have external references.

An object is said to be externally reachable if and only if it is possible to reach that object by following a path, which consists of one or more references that begin with an external reference. All other objects are said to be externally unreachable. A user or program can no longer access an externally unreachable object; hence the object's presence in the environment may be superfluous. It may be desirable to destroy an object after it becomes externally unreachable.

When the last external reference to an object is removed, one of two things can happen. Either the object becomes externally unreachable, in which case the object can be destroyed, or the object continues to be externally reachable, albeit indirectly, because the object lies on a path that originates at an external reference.

An embodiment provides a mechanism for controlling disposition of objects by efficiently distinguishing between externally reachable objects, which must be preserved, and externally unreachable objects, which can be safely destroyed. As used herein, disposition of an object means determining whether an object is in use by or accessible to, a program or user, and, on the basis of that determination, marking the object for either destruction or preservation.

Figure 1B:
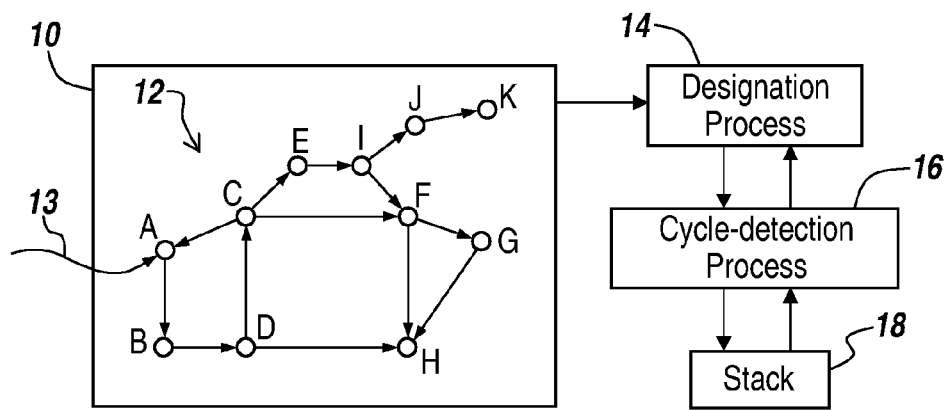
FIG. 1B depicts the directed graph of FIG. 1A following deletion of an external reference.
Figure 1C:
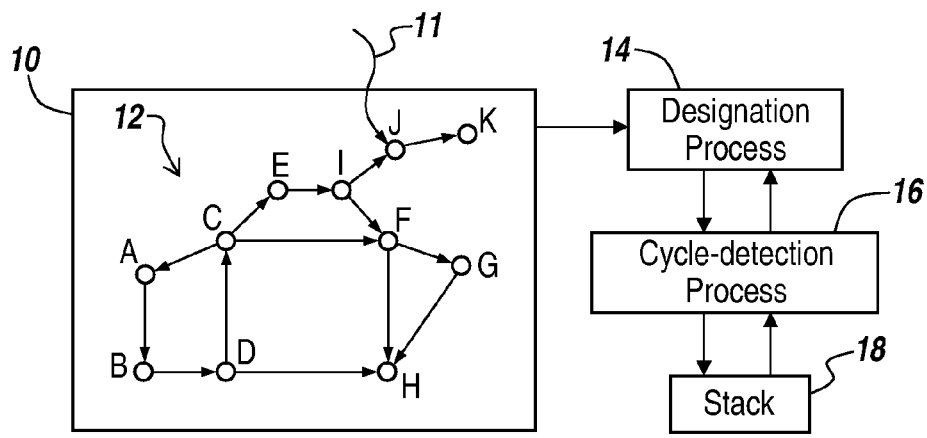
FIG. 1C depicts the directed graph of FIG. 1A following deletion of a different external reference.

FIG. 1A depicts a directed graph representing relationship between objects in a system. FIG. 1B depicts the directed graph of FIG. 1A following deletion of an external reference. In FIG. 1B, if the external reference 11 to node J were to be severed, as shown, nodes J and K continue to be externally reachable. In particular, beginning at external reference 13 to node A, one could traverse a path through nodes B, D, C, E, and I to reach nodes J and K. The objects corresponding to nodes J and K therefore should be preserved. In contrast, FIG. 1C depicts the directed graph of FIG. 1A following deletion of a different external reference. In FIG. 1B, external reference 13 to node A has been severed with the result that nodes A through I all become externally unreachable and therefore may be destroyed. Only nodes J and K remain externally reachable.

Designation Process

An embodiment discussed herein provides a designation process 14 for efficiently distinguishing between the configurations shown in FIGS. 1B and 1C. Designation process 14 monitors references to the objects in environment 10 to determine whether particular objects are still necessary. Designation process 14 communicates with a cycle detection process 16 that determines whether an object that has had a link severed must be preserved. Designation process 14 may be informed about the deletion of an external or internal reference in many ways. For example, object references may send a message to the designation process 14 upon deletion. Alternatively, an object-oriented programming language execution system may be used. Examples of an object-oriented programming language execution system may include a language compiler, an interpreter, a virtual machine, etc. The execution system may notify designation process 14 at the points in the execution stream where an object reference stored in a local variable, global variable, function parameter, or any other storage location goes out of scope or is reassigned to a new value. An execution stream is a representation of the instructions to be executed by the object-oriented environment including, but not limited to, an array of machine language code, or an array of virtual machine language byte codes.

In an embodiment, designation process 14 and cycle detection process 16 may be implemented as methods of a class used to represent all objects within an environment. That class may define reference counters where creating a reference increments a counter and deleting a reference decrements a counter. The increment and decrement may be accomplished through methods that notify the designation process, through a method call, of the addition or subtraction of different kinds of references.

Cycle-Detection Process

In an embodiment, cycle detection process 16 begins traversing all paths leading out from all nodes in digraph 12. As discussed further herein, the traversal of the paths may be a recursive procedure. Cycle detection process 16 thus maintains a stack 18 for pushing and popping objects, as required.

In some cases, a path may intersect itself. An intersecting path that starts and returns to the same object, is referred to in graph theory as a "circuit" or "strongly connected component." As described herein, a cyclic path is a strongly connected component having the additional properties that: no node within the strongly connected component has an external reference; and no node within the strongly connected component is reachable from an object having an external reference. All other paths are referred to as acyclic paths.

Cyclic and acyclic paths are identified for objects being considered for destruction. For a particular object being considered for destruction, hereafter referred to as a candidate object, cycle detection process 16 determines a number of cyclic paths to that object. Cycle detection process 16 compares the number of cyclic paths with a number of internal references to that object. If the comparison shows equal numbers of internal and cyclic references, then designation process 14 is informed that the candidate object is only cyclically referenced. Otherwise, designation process 14 is informed that not all references to the candidate object are cyclic. On the basis of this information, designation process 14 designates the candidate object for either destruction (for an object that is only cyclically referenced) or preservation (for an object that includes at least one acyclic reference).

Designation process 14 and cycle detection process 16 interact to determine the number of cyclic paths to a candidate object. The counting of cycles requires at least two traversals of a digraph to complete. The first traversal obtains a number of cyclic paths for a candidate object. The last traversal removes cycle markers and records the number of known acyclic references to an object. In an embodiment, objects reachable from the candidate objects that have external references are not traversed because references from those objects can not be cyclic references to the candidate object.

Designation process 14 evaluates whether a candidate object should be destroyed upon the deletion of an internal or external reference to the candidate object. Designation process 14 determines whether the candidate object has any remaining external references. If so, designation process 14 recognizes the candidate object as being externally reachable and designates it for preservation.

As noted above in the discussion of FIGS. 1A-1C, an object may be externally reachable even if there are no external references to the object. In recognition of this, if designation process 14 determines that there are no more external references to the object, designation process 14 identifies whether there are any internal references to the object. If the object does not have internal references, then the object has neither internal nor external references. Such an object is not reachable at all, internally or externally. Hence, the object can safely be destroyed. If the object has internal references, designation process 14 instructs cycle detection process 16 to count the number of cyclic paths leading to the candidate object. Exemplary mechanisms for counting cyclic paths are discussed further below.

Designation process 14 compares the number of identified cyclic paths to a candidate object with the number of internal references to the candidate object. If the number of cyclic paths is not equal to the number of internal references, the inequality indicates that there is a way to reach the candidate object from an external reference. Accordingly, if a cyclic value representing the number of cyclic paths for a candidate object is not equal to the number of internal references, designation process 14 designates the object for preservation. On the other hand, if the number of cyclic paths that includes a candidate object is equal to the number of internal references, then none of the internal references can originate at an external reference. In this case, designation process 14 recognizes the candidate object as having become externally unreachable and may designate it for destruction.

Traversal of Digraph

Cycle detection process 16 determines the number of cyclic paths for a candidate object. Cycle detection process 16 first determines a number of cyclic paths to the candidate object. Mechanisms for determining the number of cyclic paths are discussed in greater detail below. Cycle detection process 16 then executes a procedure that removes all cycle markers from all objects (the details of the removal procedure are discussed further below). Cycle detection process 16 also records the difference (if any) between the number of internal references and the number of cyclic references as the number of acyclic references and returns a result to designation process 14 indicating whether or not all internal references were determined to be cyclic.

Exemplary Traversals of Digraph

Figure 2A:
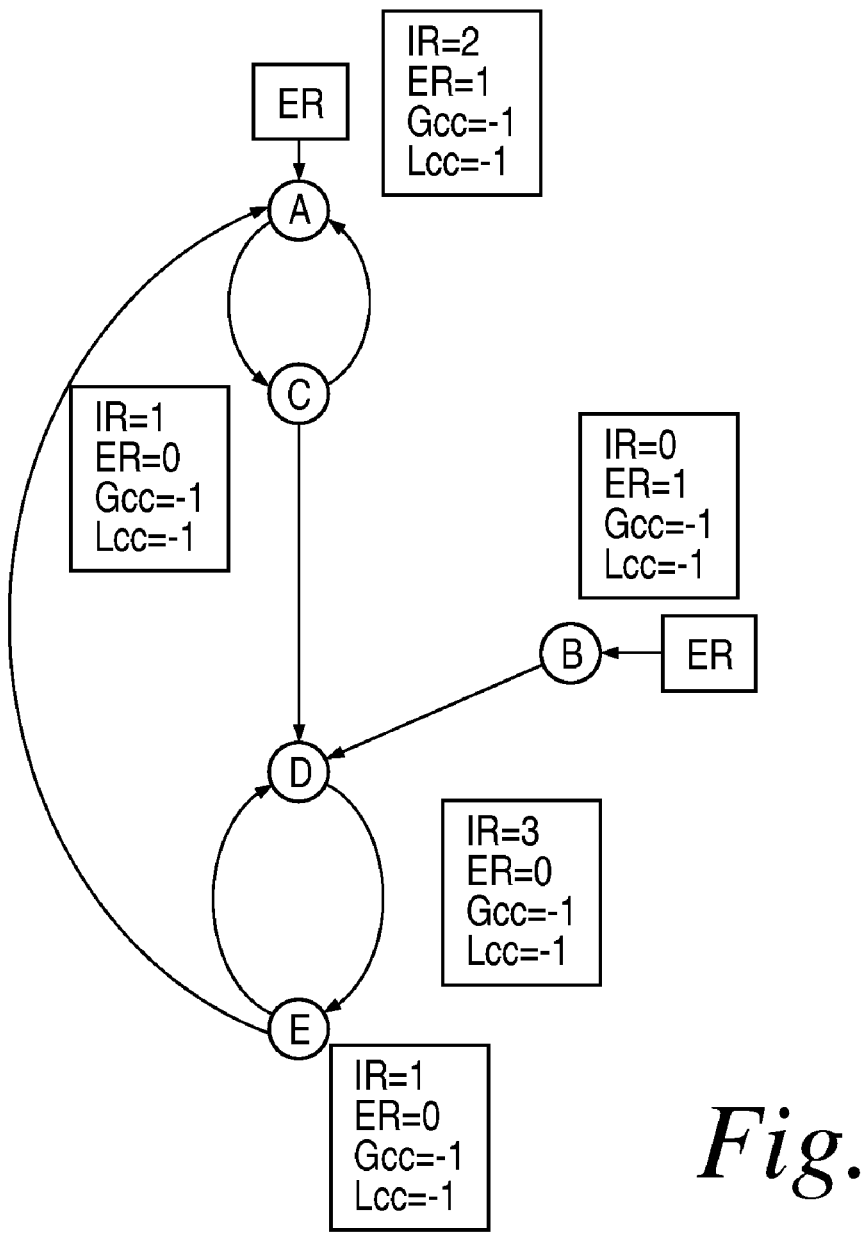
FIG. 2A depicts an exemplary directed graph of object relationships.

FIG. 2A depicts an exemplary directed graph of object relationships. The digraph of FIG. 2A represents an environment that includes five objects A-E. Two of these objects, A and B, have external references and object A also has internal references pointing to it (from objects C and E). The remaining three objects C, D, E have only internal references pointing to them.

Each object in FIG. 2A has a pair of static counts that are associated with the object. The first type of static count is an external-reference count (abbreviated as "ER" in the figure) indicating the number of external references to that object. The second type of static count is an internal reference count (abbreviated as "IR" in the figures) that indicates the number of internal references to that object. These counts are referred to as static counts because they do not change during the process of detecting cyclic paths for a candidate object.

The separation of references into internal and external references, rather than aggregating references together regardless of their origin, permits designation process 14 to summarily designate an object for preservation immediately upon recognizing that its external count is non-zero. As a result, designation process 14 may limit the calls to the more time-consuming cycle detection process 16 to determine whether the object in question must be preserved to those circumstances where there are no external references remaining.

Cycle detection process 16 may also compare the number of internal references to a candidate object with a number representing internal references back to the candidate object that are contained in objects that are reachable from the candidate object but not reachable through any external reference. Cycle detection process 16 compares these two quantities using a pair of dynamic counts to determine the number of cyclic paths for a candidate object. These counts are temporarily associated with each object during the execution of cycle detection process 16. The two counts are dynamic counts because they are updated during the execution of cycle detection process 16. In one embodiment, the dynamic counts include a global cycle count and the local cycle count. These counts are shown in FIGS. 2A-2L as "Gcc" and "Lcc" respectively.

Figure 2B:
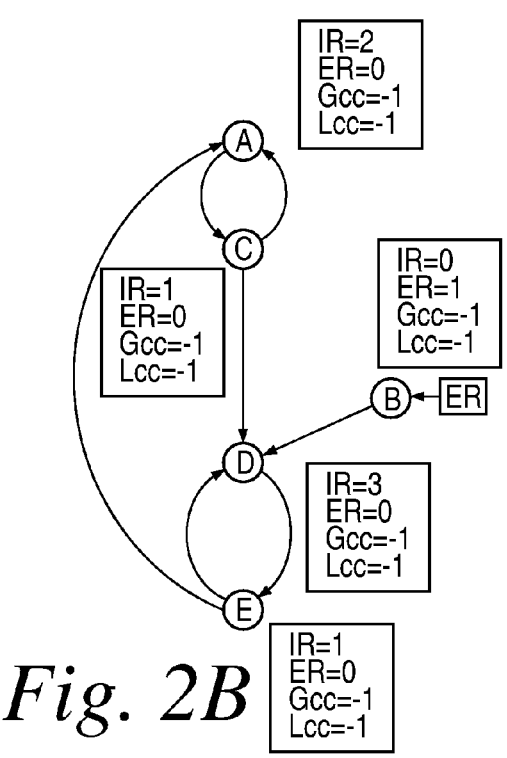
FIGS. 2B-2L depict the directed graph of FIG. 2A at several stages during an exemplary examination of the directed graph to identify cyclic paths for a candidate object.

FIGS. 2B-2L depict the directed graph of FIG. 2A at several stages during an exemplary examination of the directed graph to identify cyclic paths for a candidate object. In FIG. 2B, a user has deleted the sole external reference to object A. Since object A no longer has any external references, it is possible that object A is not needed and should be destroyed. However, it is also possible that another object, which does have an external reference, also refers to object A, either directly or indirectly. Cycle detection process 16 distinguishes between these two cases. For example, in FIG. 2B, object B has an external reference. In addition, object B refers indirectly (by way of objects D and E) back to object A. Hence, it would not be appropriate to delete object A, or objects D and E, because to do so would delete an object still in use by object B.

In FIG. 2B, the process of distinguishing between objects that should or should not be deleted begins by decrementing the external-reference count for object A to zero following the deletion of the external reference to object A. Designation process 14 recognizes that object A has no external references and that object A has at least one internal reference. Accordingly, designation process 14 refers object A to cycle detection process 16. Cycle detection process 16 designates object A as an input object. Cycle detection process 16 then attaches a cycle marker to object A. The cycle detection process 16 initializes the process by setting the dynamic Gcc and Lcc counts to zero. This places the digraph in the state shown in FIG. 2C (a value of −1 in the figures designates counts that have not yet been initialized in this way).

Figure 2C:
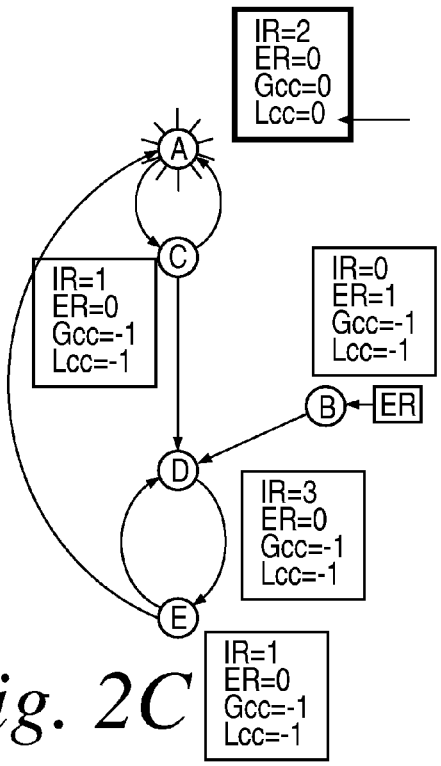
Figure 2D:
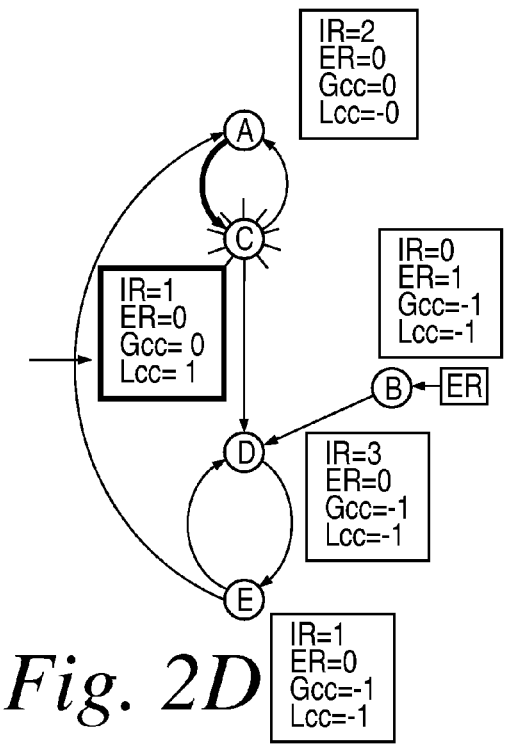
Figure 2E:
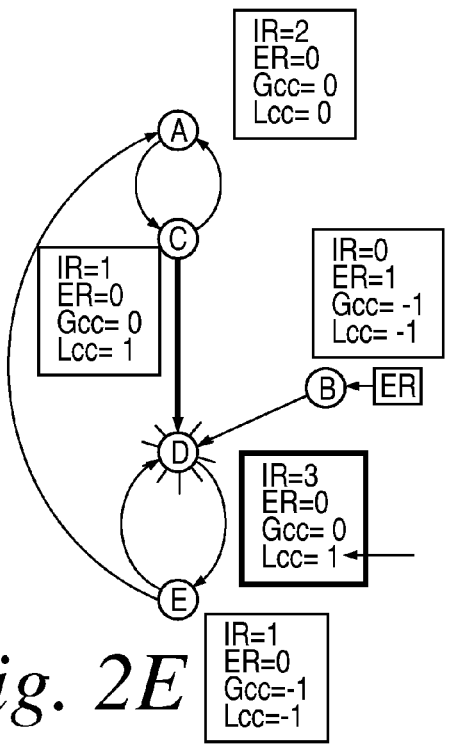

Cycle detection process 16 then traverses all links leading from the current object. To do so, Cycle detection process 16 determines whether the current object includes links to other objects that have not been traversed. In FIG. 2C, object C can be reached from object A. Accordingly, cycle detection process 16 pushes the current object, which is object A, onto stack 18 and resets the current object to object C. Cycle detection process 16 then identifies that object C (the current object), has its external-reference count set to zero, indicating that there are no external references to object C. Since there are no external references to object C, the cycle detection process 16 increments the local cycle count for the current object (object C). To do so, the cycle detection process 16 determines whether the current object already has an associated cycle marker. Since this is the first visit to object C, the dynamic counts have not yet been initialized. The cycle detection process 16 therefore initializes the dynamic counts to zero and increments the local cycle count of the current object (object C). This places the digraph in the state shown in FIG. 2D.

After incrementing the local cycle count of object C, cycle detection process 16 compares the local cycle count of the current object with the internal reference count of the current object. If these counts are equal to each other, as is the case here, the global cycle count of the previous current object (namely object A) is incremented by the global cycle count of the current object. The global cycle count of the current object is then reset to zero. Since all these values are presently zero, there is no actual change in the global cycle counts of object A and C.

Cycle detection process 16 then determines whether there are any objects referenced by the current object, which is still set to object C. Since object C references object D, the answer is yes. Hence, the cycle detection process 16 pushes object C onto stack 18 and resets the current object to be object D. The procedure set forth above is then repeated, except with object D as the current object. This places the digraph in the state shown in FIG. 2E, in which object D has its global cycle count set to 0 and its local cycle count set to 1.

Figure 2F:
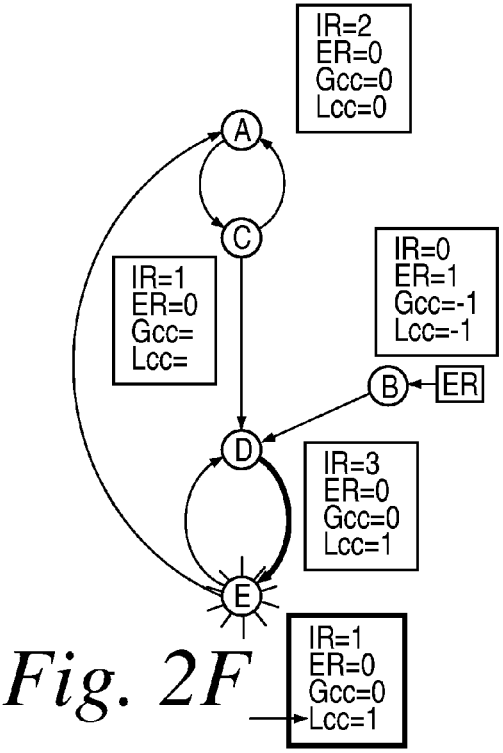
Figure 2G:
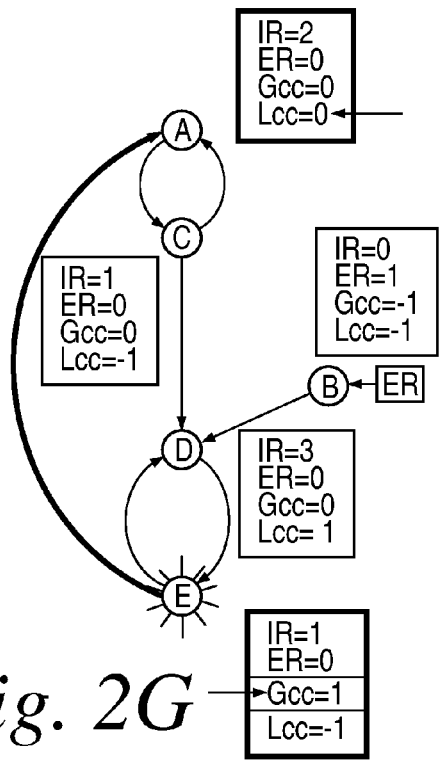
Figure 2H:
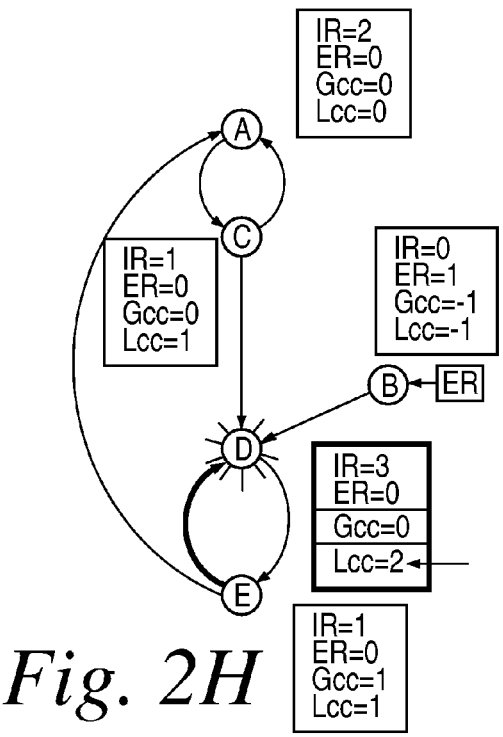
Figure 2I:
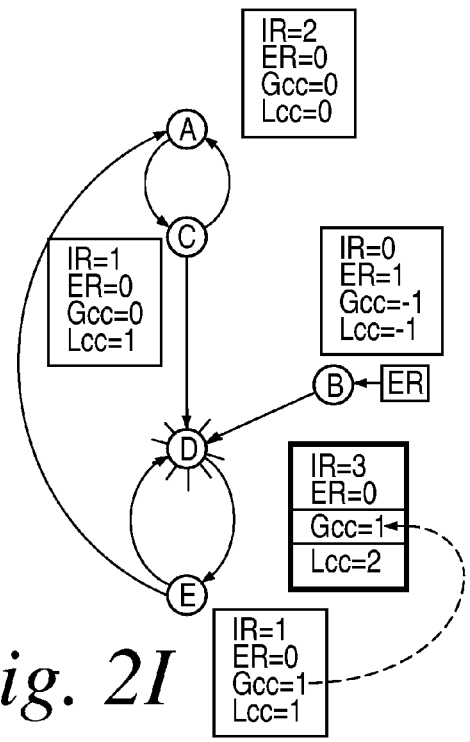
Figure 2J:
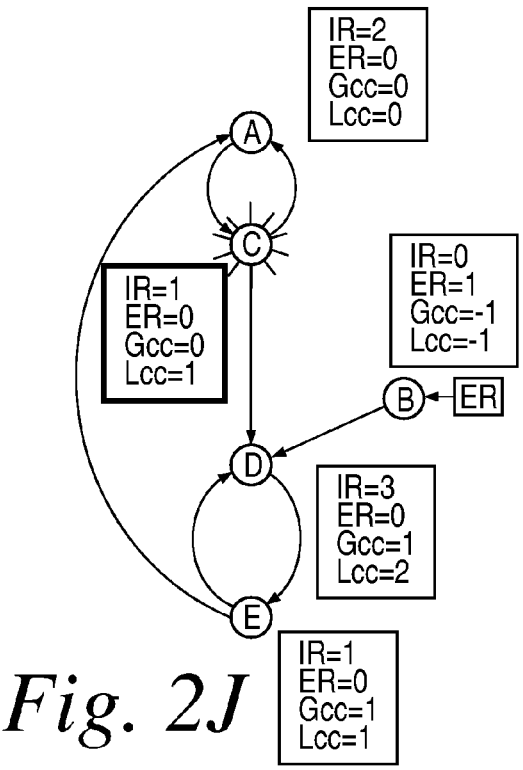

Once again, cycle detection process 16 determines whether there are any objects referenced by the current object, which is now set to object D. Because object E can be reached from object D, the answer is "yes". Cycle detection process 16 thus proceeds as already described above, thereby placing the digraph in the state shown in FIG. 2F. In FIG. 2F, object E has its global cycle count set to 0 and its local cycle count set to 1.

With the current object now set to object E, cycle detection process 16 again determines whether object E refers to any other objects. In this case, there are two references from object E: a reference to object D and a reference to object A (the original input object). Cycle detection process 16 pushes object E onto stack 18 and sets the current object to be the input object, namely object A. This causes cycle detection process 16 to proceed in a manner that is somewhat different from that described above.

Cycle detection process 16 first determines that object A's external-reference count is still equal to zero. Cycle detection process 16 recognizes that object A already has a cycle marker and that object A is the same as the input object. The identification of object A as the input object causes cycle detection process 16 to increment the global cycle count for the most recent current object on the stack 18 (object E), instead of the local cycle count for the current object, namely object A. Cycle detection process 16 then pops the most recent current object, namely object E, off stack 18 and sets the current object back to that most recently popped object (object E). This places the digraph in the state shown in FIG. 2G.

Cycle detection process 16 then traverses the remaining reference from object E, namely the one that leads back to object D. This traversal results in object D being designated the current object. However, in this case, the cycle detection process 16 recognizes that the current object (object D) and the input object are not equal. Cycle detection process 16 therefore increments the local cycle count of the current object. The cycle detection process 16 compares the local cycle count of the current object (object D) with the internal reference count of the current object. Since these counts are unequal, the cycle detection process 16 leaves the digraph in the state shown in FIG. 2H, in which object D's local cycle count has been incremented to 2 and all global cycle counts are unchanged.

Continuing the exemplary traversal, Object E is popped off the stack and designated the current object. Cycle detection process 16 now recognizes that all references from the current object E have been considered and checks to see if the current object (E) is also the input object. Since the current object (E) is not object A (the input object), cycle detection process 16 proceeds to compare the local cycle count of the current object (E) with the internal reference count of the current object. This time, the internal reference count of the current object and the local cycle count of the current object are both equal to 1. As a result, cycle detection process 16 increments the global cycle count of the previous current object (object D) by adding to it the global cycle count of the current object. This places the digraph in the state shown in FIG. 2I, in which the global and local cycle counts of object D are set to 1 and 2 respectively.

Next, cycle detection process 16 pops the previous current object, which is now object D, off stack 18 and makes that object the current object. Since there are no further objects reachable from object D, and since the current object is not the input object, cycle detection process 16 compares object D's local cycle count with its internal reference count. Because the local cycle count, 2, and the internal reference count, 3, are unequal, the global cycle count of the previous current object is left alone. The digraph is now in the state shown in FIG. 2J.

Cycle detection process 16 then pops the previous current object, which is object C, off stack 18 and makes that object the current object. This time, there is one reference from the current object that has not been considered, namely the reference back to the input object. Cycle detection process 16 pushes the current object C back onto stack 18 and sets the current object to be object A. Since object A's external reference count is zero, object A already has a cycle marker, and object A is the input object, cycle detection process 16 increments the global cycle count of object C. This places the digraph in the state shown in FIG. 2K, in which the global cycle count of object C has been incremented to 1.

Cycle detection process 16 then pops object C back off stack 18 and sets the current object back to object C. This time, all references from object C have been considered. Since the current object is still not the input object, and since the local cycle count and the internal reference count of object C are equal, the global cycle count of the previous current object (which is object A) is incremented by the global cycle count of the current object (which is now 1). This places the digraph in the state shown in FIG. 2L, in which the global cycle count of object A is now 1.

Cycle detection process 16 then pops object A off of stack 18 and sets object A as the current object. Since all references by object A have been considered, cycle detection process 16 determines whether the current object and the input object are the same. This time the objects are the same. Cycle detection process 16 sets the number of cyclic paths to be the global cycle count from the input object. This completes the first traversal of the digraph. The result of this first traversal is a digraph in which each object has a cycle marker and in which the cycle marker for the candidate object includes a global cycle count indicating the number of cyclic paths to the candidate object.

Cycle detection process 16 checks to see if the number of cyclic paths (the cyclic value) for the candidate object is equal to the number of internal references. In this example, the answer is "no" because node A's internal reference count is set to 2 and the number of cyclic paths (as reflected in the global cycle count) is only 1. Accordingly, cycle detection process 16 proceeds directly to remove all cycle markers and to set the number of acyclic paths to be the difference between the number of internal references and the number of cyclic paths.

The number of cyclic paths and the internal reference count for the input object are compared again for the purpose of finally determining whether the object is to be preserved or destroyed. If the number of cyclic paths is less than the internal reference count, the input object (i.e. the candidate object) can be reached indirectly by another external reference and therefore should be preserved. If the number of cyclic paths is equal to the internal reference count, the equality indicates that the input object is not reachable by an external reference and can be safely destroyed. In this case, the global cycle count of object A, which is 1, is less than its internal reference count, which is 2. Consequently, the candidate object A is designated for preservation.

Externally Unreachable Objects

Figure 3A:
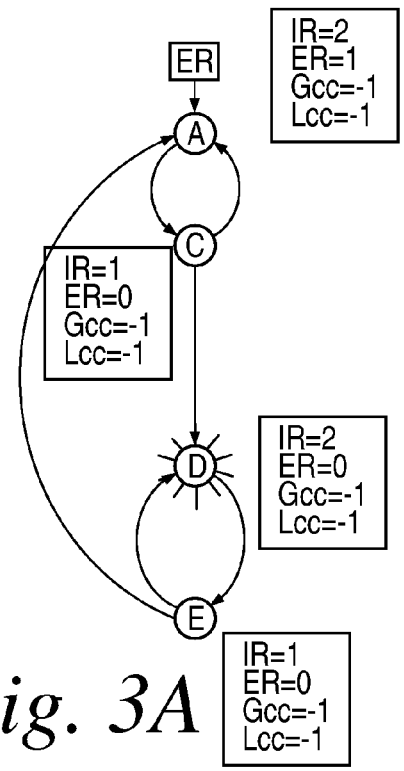
FIGS. 3A and 3B illustrate an exemplary technique for removing an external reference to an object resulting in an isolation of objects.
Figure 3B:
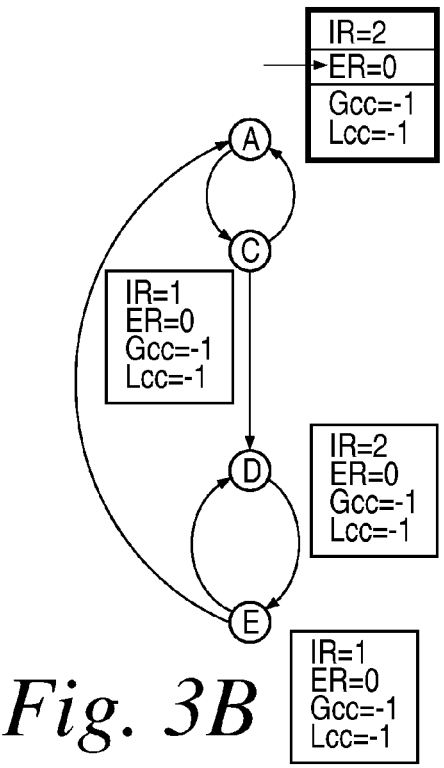

FIGS. 3A and 3B illustrate an exemplary removal of an external reference to an object resulting in an isolation of objects. FIG. 3A shows a digraph that is identical to that shown in FIG. 2A with the exception that object B and its external reference have been removed. When the external reference to object A is removed, as shown in FIG. 3B, the digraph becomes isolated from all external references. In this case, it is sensible to destroy objects A, C, D, and E as they are all externally unreachable. Accordingly, any action associated with these objects that is to be performed when the objects are no longer needed may now be performed. For example, system resources associated with the objects may be released when the objects become externally unreachable.

Figure 4A:
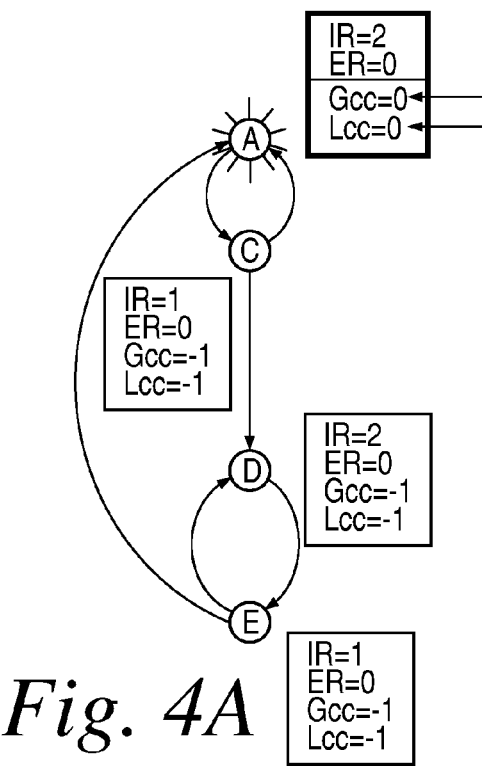
Figure 4B:
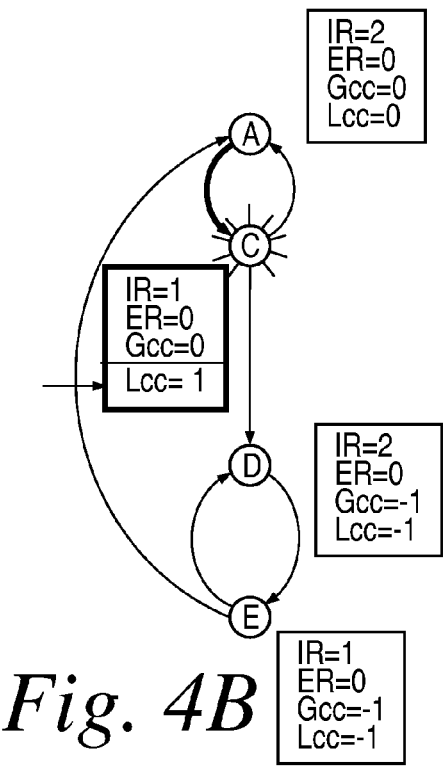
Figure 4C:
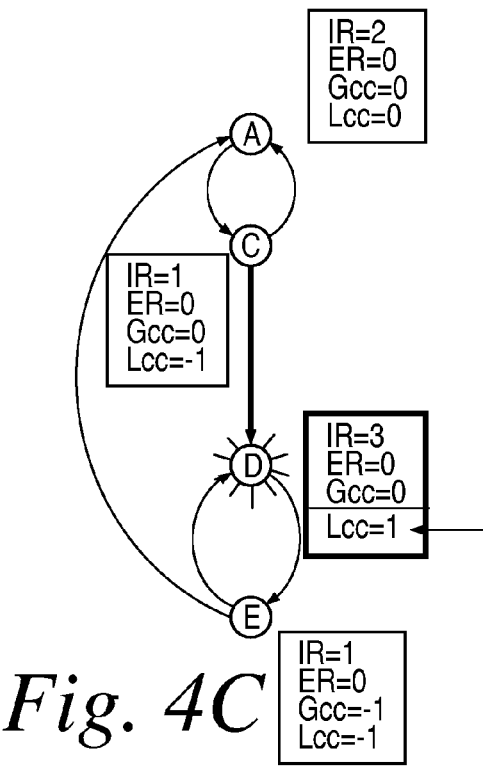
Figure 4D:
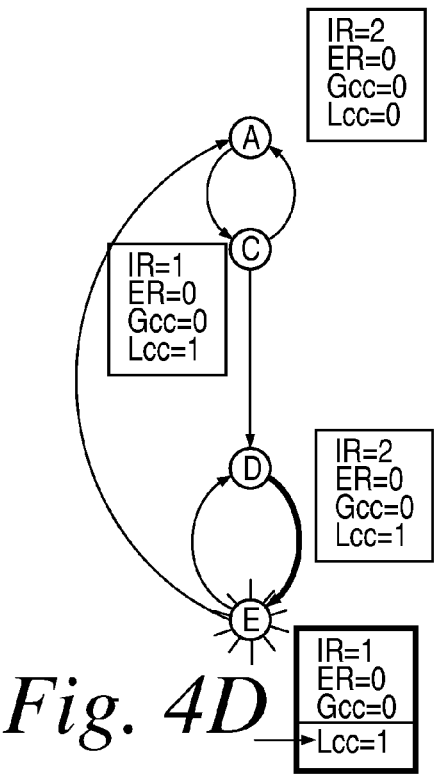
Figure 4E:
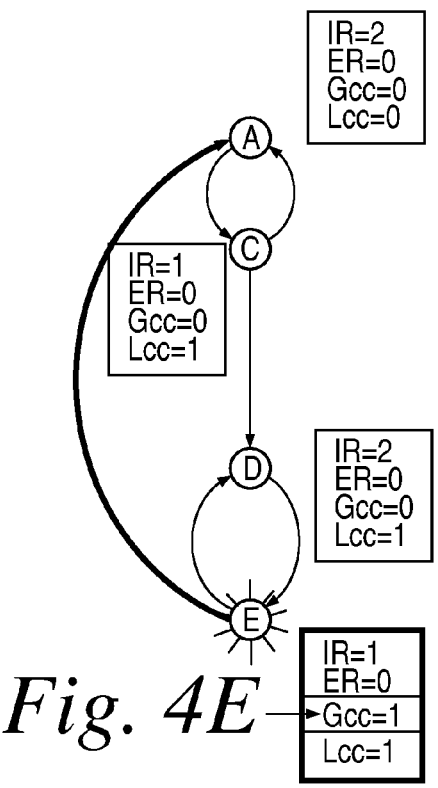
Figure 4F:
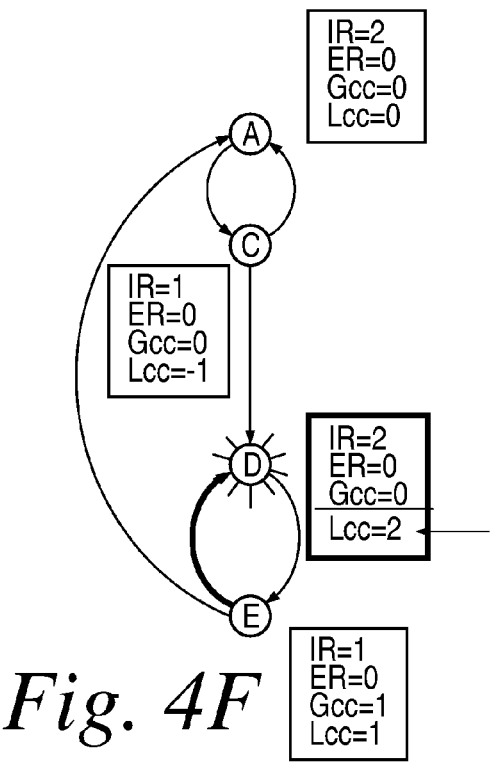
Figure 4G:
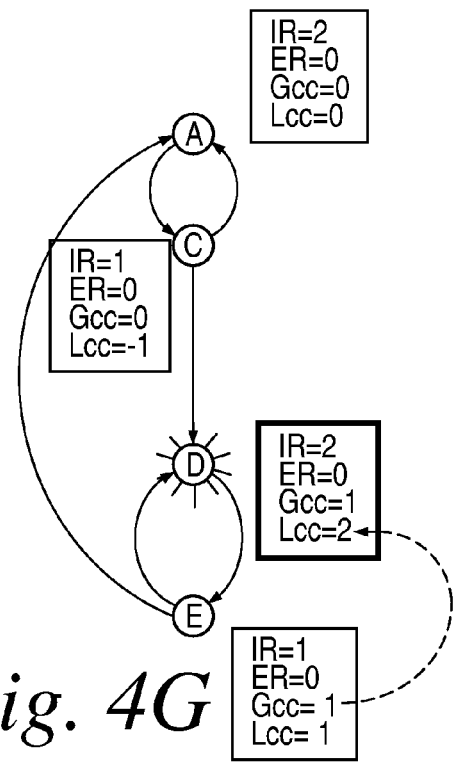
Figure 4J:
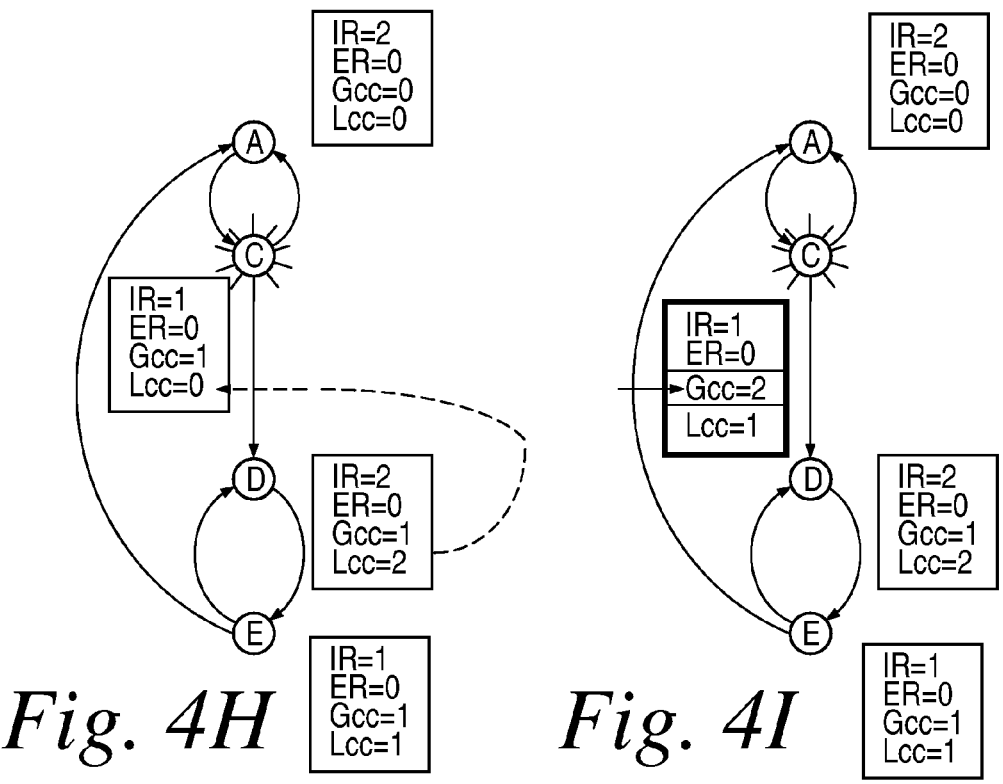
Figure 4J:
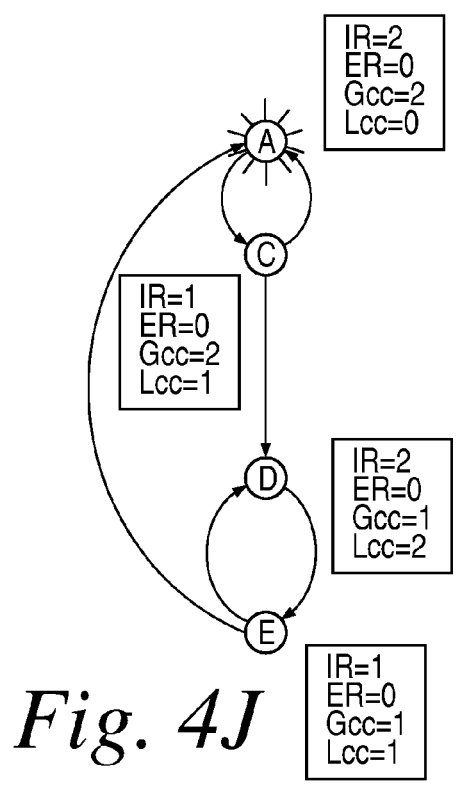

FIGS. 4A-4J depict stages during an exemplary examination of a directed graph by an embodiment that lead to a destruction of a candidate object. As discussed above, cycle detection process 16 may be used for determining whether to destroy a candidate object (object A). In one embodiment, cycle detection process 16 initializes the dynamic counters for object A to zero, as shown in FIG. 4A. The local cycle count for objects C, D, and E are then incremented, as shown in FIGS. 4B-4D. Because object E has a reference back to object A, the global cycle count for object E is incremented, as shown in FIG. 4E. The local cycle counter for object D is incremented for the second time in FIG. 4F. Object D's global cycle count then inherits the value of the global cycle count of object E, as shown in FIG. 4G. These transitions all occur for the same reasons already described in connection with FIGS. 2A-2L.

Cycle detection process 16 then pops the previous current object, which is now object D, off stack 18 and makes that object the current object. Since there are no further objects reachable from object D, and since the current object is not the input object, cycle detection process 16 compares object D's local cycle count with its internal reference count. This time, and in contrast to the previous example discussed with reference to FIGS. 2A-2L, the local cycle count, 2, and the internal reference count, 2, are equal. Therefore, the global cycle count of the previous current object is incremented by the global cycle count of the current object. This places the digraph in the state shown in FIG. 4H, in which object C inherits the global cycle count of object D.

Figure 2K:
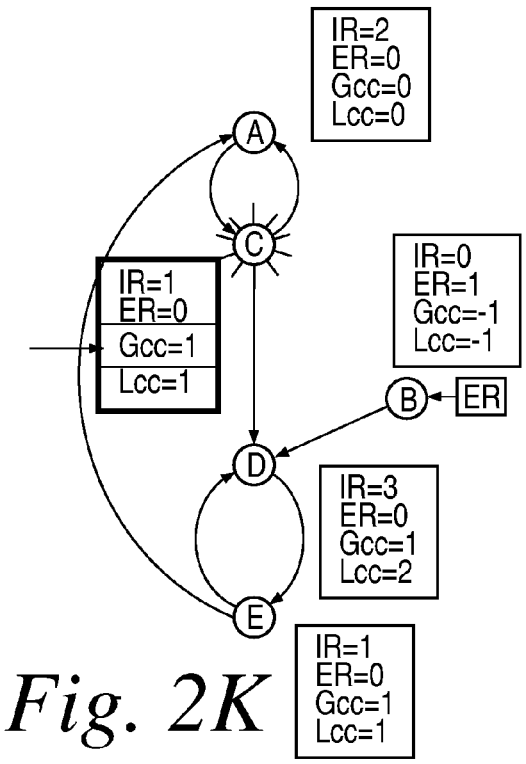
Figure 2L:
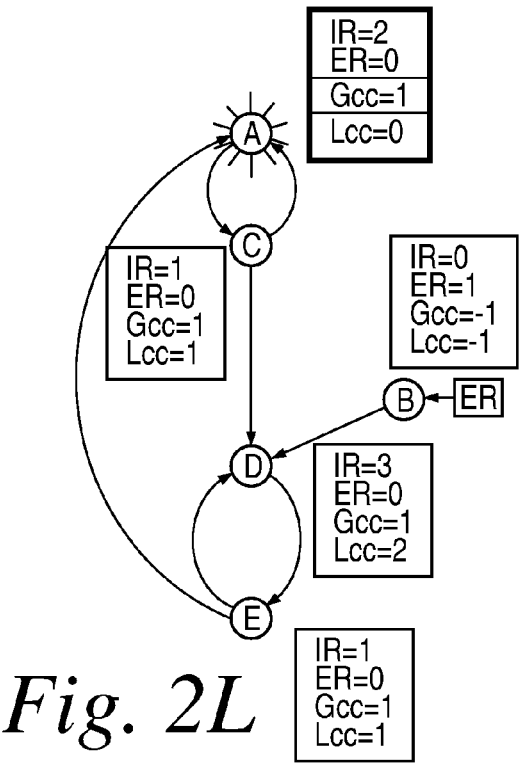

The global cycle count for object C is again incremented for reasons already discussed in connection with FIG. 2K. This places the digraph in the state shown in FIG. 4I, in which the global cycle count of object C is now equal to the internal reference count of the input object. As a result, when the input object inherits the global cycle count of object C, for reasons already discussed in connection with FIG. 2L, its global cycle count becomes equal to its internal reference count. This places the digraph in the state shown in FIG. 4J.

Following execution of the procedure for counting cyclic paths, the cycle detection process 16 identifies whether the number of cyclic paths is equal to the number of internal references to the candidate object. In the first example detailed in FIGS. 2A-2L, the number of cyclic paths does not equal the number of internal references to the candidate object and the step of determining whether the digraph includes acyclic nodes may be skipped. In this second example detailed in FIGS. 4A-4J, the number of cyclic paths does equal the number of internal references to the candidate object and the candidate object may be considered for destruction.

Re-Use of Cyclic Path Information

As discussed above, when an object is considered for destruction, all of the objects reachable from the candidate object being considered for destruction are also considered up until the point that a determination is reached that the candidate object must be preserved or all objects have been considered. The process of identifying the suitability of an object for destruction identifies cyclic values for each object considered that represent the number of references to the processed object that are cyclic. In some embodiments, this cyclic value information is destroyed after each traversal using a technique discussed below. Accordingly, the next time the object is considered for destruction, the object management system for the object-oriented environment must conduct a new traversal to decide whether the object can now be destroyed. Given that each object may be considered for destruction many times before it is actually destroyed by an object management system, the destruction of the gathered information after each traversal may be inefficient because under certain circumstances the information gathered in the first traversal would have remained valid if not destroyed. Accordingly, in one embodiment, gathered cyclic information is stored and retained until such time as it becomes invalid. The stored cyclic information allows the object management system to avoid subsequent reprocessing of the objects while the stored information remains valid.

As noted, a cyclic value representing the number of cyclic paths for a candidate object may be stored for later use. Similarly, a byproduct of the cycle detection process for a candidate object is the determination of a cyclic value for those objects reachable from the candidate object. In another embodiment, the cyclic value representing the number of cyclic paths for an object reachable from the candidate object that is determined as a byproduct of examining the candidate object may also be stored. Additionally, in one embodiment, a number of acyclic references may be computed as the difference between the number of internal references and the number of cyclic references. This number of known acyclic references or acyclic value may also be stored in place of the cyclic value. In addition to the candidate object, each object traversed by the candidate object has also had a cyclic value or acyclic value computed and this value can also be retained. As long as nothing changes in the directed graph that invalidated the computed cyclic or acyclic values, any future consideration of such objects for destruction may use the stored cyclic or acyclic value and avoid the expense of calculating the number of cyclic references to the candidate object. In other words, under certain conditions, the previously determined cyclic or acyclic value for an object may be used in determining whether to destroy or preserve an object without requiring a new cyclic path detection procedure.

Cyclic Marker Deletion

Cycle detection process 16 includes a procedure for deleting cycle markers added to a digraph. This deletion procedure traverses the digraph in the same manner discussed above but may take different actions at each node. The deletion procedure is initialized by setting an input object to be the candidate object. Then, the current object is set to be the input object. Cycle detection process 16 determines whether there are additional objects that can be reached from the current object. If there are additional objects that can be reached from the current object, the current object is pushed onto the stack and the object that was reachable from the current object becomes the new current object. This new current object is examined to determine if it has a cycle marker. If the new current object has a cycle marker, the cycle marker is removed, and the cycle detection process proceeds to the next object, if any. If the current object does not have a cycle marker, the cycle detection process pops the current object off the stack and proceeds to the next object, if any. Eventually cycle detection process 16 reaches a point at which all nodes reachable from a particular node have been examined. Cycle detection process 16 recognizes that this point has been reached by noting that there are no more objects that can be reached from the current object. When all the reachable nodes have been examined, cycle detection process 16 determines whether the current object is the input (i.e. candidate) object. If the current object is not the input object, the cycle detection process 16 pops the previous current object off the stack and thereafter works backward toward the candidate object. If the current object is the input object, the cycle detector removes the cycle marker of the candidate object and stores the value of the global cycle count. The global cycle count value is the value that may be compared with the number of internal references to determine whether the object should be destroyed.

Acyclic Value Determination and Use

When an object is considered for destruction, a global cycle count keeps track of cyclic references to the object. At the end of the computation, when the cycle marker is being removed in the step described above, the difference between the number of internal references and the global cycle count is the number of internal references that are known to be acyclic at that time. This acyclic number may be stored in the object. Also, when cycle markers are removed, an acyclic number can be computed for each of the other traversed objects where the local cycle count is used instead of the global cycle count since the local cycle count is the number of cyclic references to that object.

Additionally, during the consideration of the destruction of an object, if the there are no external references, but there are internal references, then the object may or may not be ready for destruction depending on whether or not all of the internal references are cyclic references. If the stored acyclic value is greater than zero, then the object is known to have acyclic references and no further computation is needed as the object should be preserved. If the acyclic value is zero, then the objects reachable from the candidate object may be traversed as described previously.

Exemplary Cyclic Path Detection Processing

Figure 5:
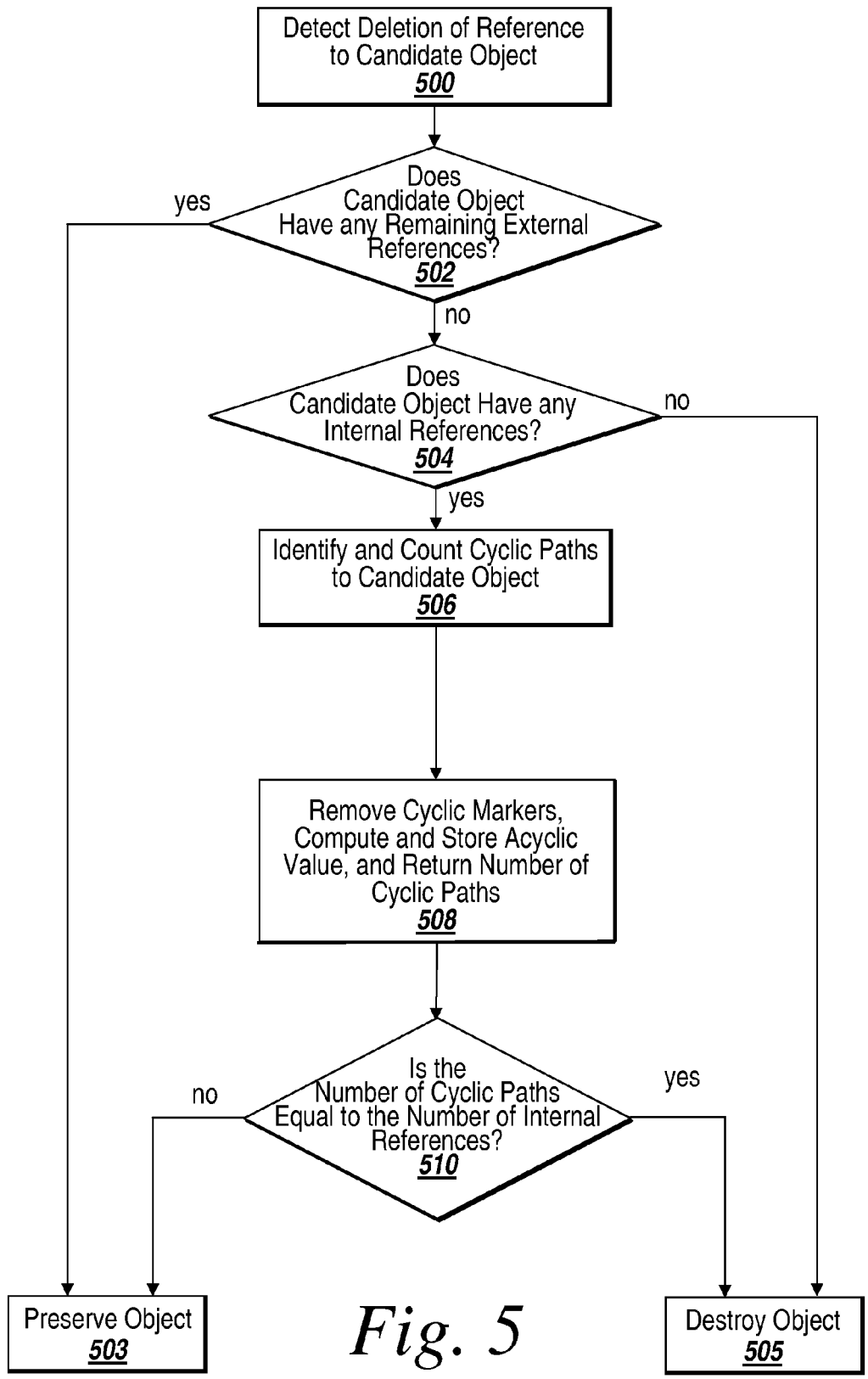
FIG. 5 depicts exemplary processing that may be performed by an embodiment to detect cyclic values.

The flowchart of FIG. 5 depicts exemplary processing that may be performed by an embodiment to detect cyclic values. The sequence begins upon the detection of a deletion of reference to a candidate object (step 500). A determination is then made as to whether the candidate object has any remaining external references (i.e. is externally reachable) (step 502). If the candidate object does have remaining external references, the candidate object is marked for preservation since it is externally reachable (step 503) and the sequence ends. Alternatively, if the candidate object does not have any remaining external references a further determination is made as to whether or not the candidate object has any internal references (step 504). If the candidate object has no internal references (and no external references), the candidate object is marked for destruction (step 504) and the sequence ends. Such an object without internal and external references is unreachable should be allowed to release any system resources or perform any action associated with the end of its lifecycle.

In the event the candidate object does have internal references (step 504), the cycle detection process identifies and counts the cyclic paths to the candidate object (step 506) as described above. Cycle detection process 16 performs a clean operation by removing cycle markers, storing a cyclic value, and returning the number of cyclic paths (step 508). Alternatively, as discussed above, an acyclic value may be stored. A determination may then be made as to whether the number of cyclic paths identified for an object is equal to the number of internal references (step 510). If the number of cyclic paths is equal to the number of internal references, the object is marked for destruction (step 505). If the number of cyclic paths is not equal to the number of internal references, indicating at least one acyclic path, the object is marked for preservation (step 503).

Exemplary Processing for Re-Using Stored Values

Figure 6:
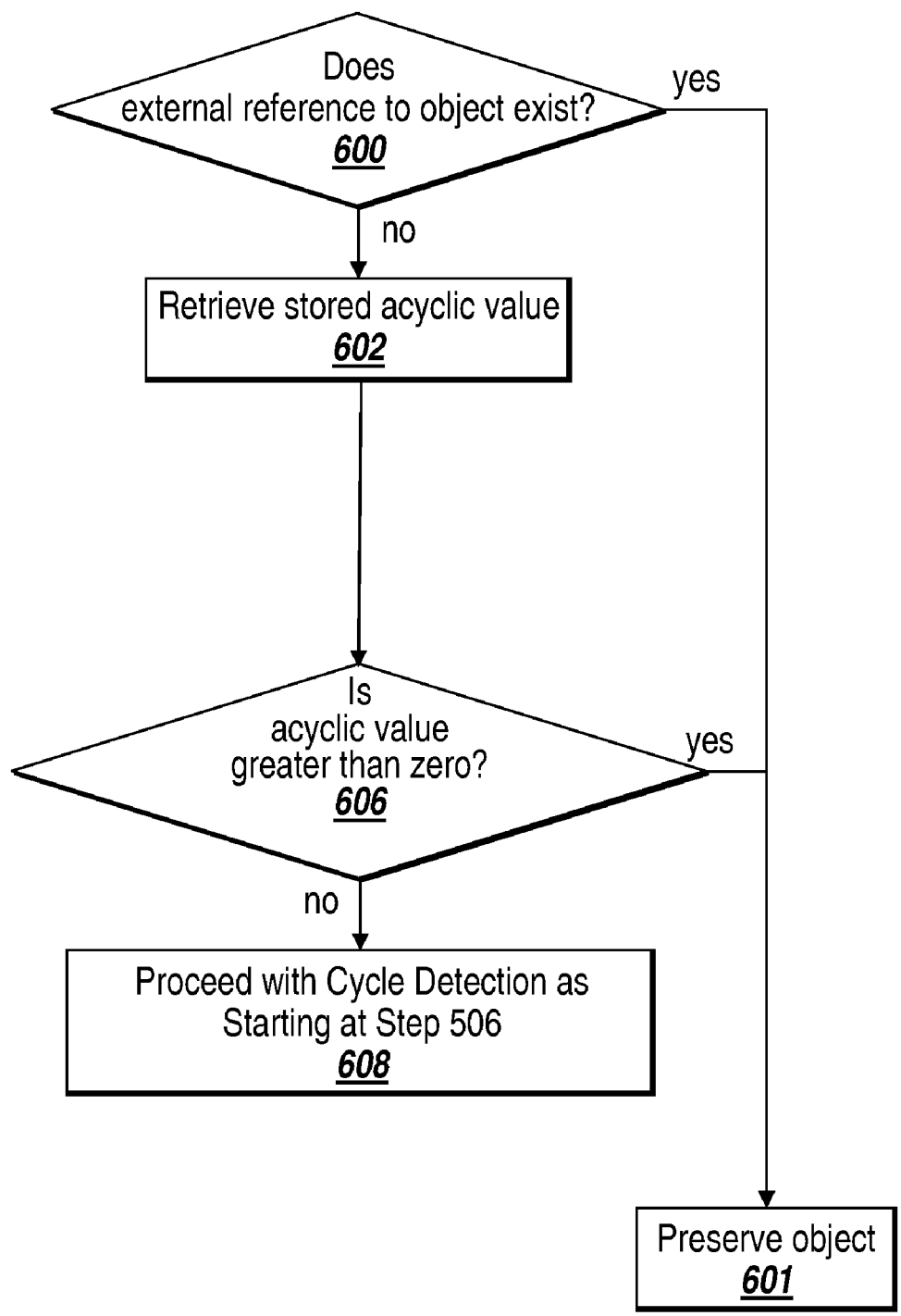
FIG. 6 depicts exemplary processing that may be performed by an embodiment to re-use stored acyclic values.

FIG. 6 depicts exemplary processing that may be performed to re-use stored acyclic values. In one embodiment, a determination may first be made as to whether an external reference to the object under consideration for destruction exists (step 600). In the event an external reference exists, and the object is therefore externally reachable, the object is marked for preservation and the sequence ends (step 601). If an external reference to the object under consideration does not exist, the stored acyclic value from a previous traversal is retrieved (step 602). A determination is then made as to whether the acyclic value is greater than zero (step 606). If the acyclic value is zero, cycle detection process 16 is required to perform a new traversal for the object under consideration (step 608). If the acyclic value is greater than zero, the object is preserved (step 601). As noted previously, cyclic values also be stored and leveraged in a like manner so as to avoid have to re-traverse the digraph.

In order to maintain the validity of the stored acyclic value, two steps should be added to the procedures described previously. When an internal reference to an object is removed, the object may subtract one from the stored acyclic value. Since there is no inexpensive way to tell if the reference being removed is cyclic or acyclic, the reference is assumed to be acyclic. If this assumption is wrong, the only effect will be to spend extra time in a later calculation. The second step is added to the initial traversal of objects reachable from an object considered for destruction. When a reachable object is encountered, its acyclic value is set to zero. This second step is necessary because acyclic values represent internal references from objects that are externally referenced (either directly or indirectly). If an object is traversed in considering another object for destruction, then an object that was previously externally referenced may no longer be externally referenced and so the previously computed acyclic value may no longer be valid. In an embodiment, a root cycle counter may be reused to store the acyclic value since the root cycle counter is only used when an object is considered for destruction or traversed from an object that is considered for destruction and then the acyclic value is invalidated and recomputed.

Exemplary Environment

Figure 7:
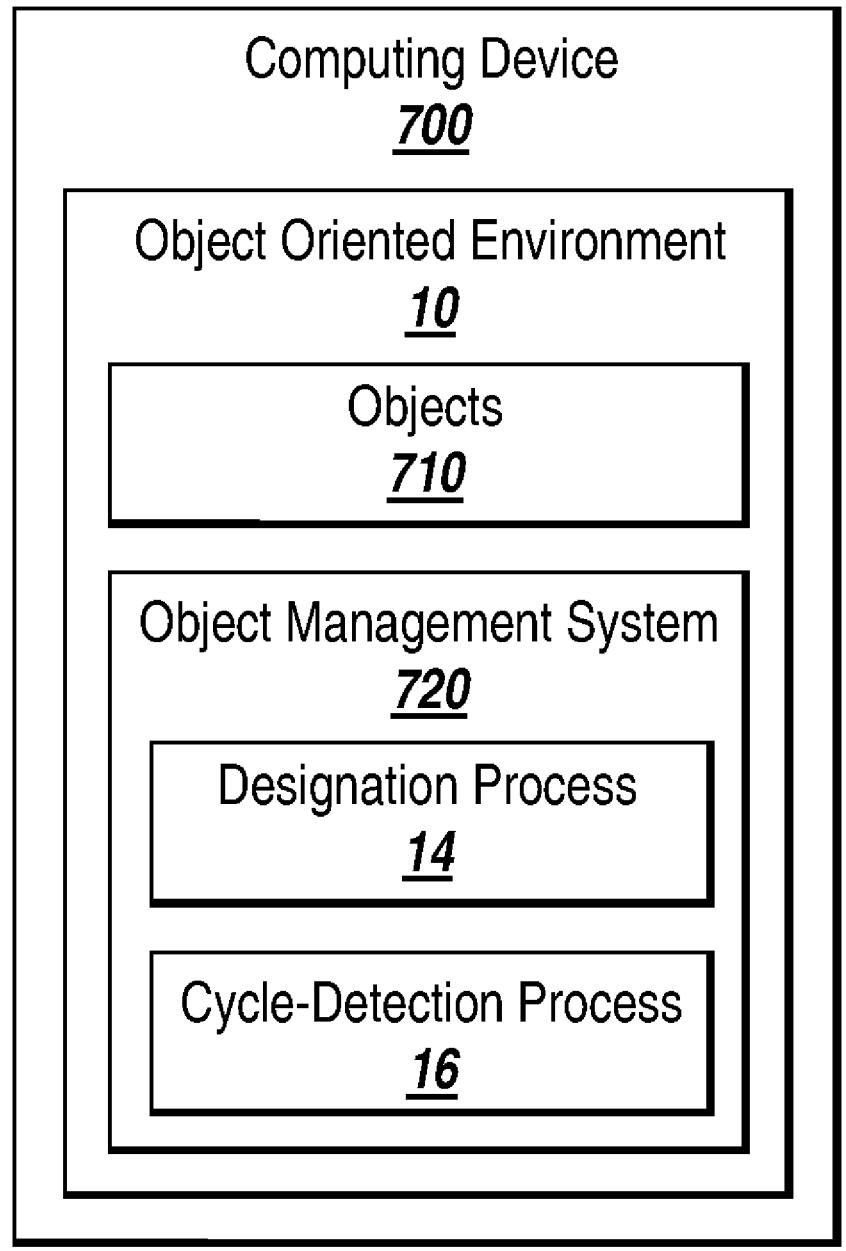
FIG. 7 depicts an exemplary computing architecture suitable for practicing an embodiment of the invention.

FIG. 7 depicts an exemplary computing architecture suitable for practicing an embodiment of the invention. A computing device 700 may host the object-oriented environment 10 described above. The object oriented environment 10 may include objects 710 that are collectively managed by an object management system 720. The objects 710 may collectively form a model such as a block diagram model or other type of model. The object management system 720 may include designated process 14 and cycle detection process 16 discussed above. The computing device 700 may include short or long term memory that is allocated to the object oriented environment 10 and the object management system 720.

ADDITIONAL ALTERNATIVE EMBODIMENTS

The present invention may be provided as one or more computer-readable programs embodied on or in one or more mediums. The mediums may be a floppy disk, a hard disk, a compact disc, a digital versatile disc, a flash memory card, a PROM, an MRAM, a RAM, a ROM, or a magnetic tape. In general, the computer-readable programs may be implemented in any programming language. Some examples of languages that can be used include MATLAB, FORTRAN, C, C++, C#, Python or Java. The software programs may be stored on, or in, one or more mediums as object code. Hardware acceleration may be used and all or a portion of the code may run on a FPGA, an Application Specific Integrated Processor (ASIP), or an Application Specific Integrated Circuit (ASIC). The code may run in a virtualized environment such as in a virtual machine. Multiple virtual machines running the code may be resident on a single processor.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 5 and 6, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations discussed in FIGS. 1A-4J depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, software, wetware, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

The invention claimed is:

1. A computer readable medium holding computer-executable instructions that, when executed on a processor, control disposition of a candidate object in an object-oriented environment, the instructions comprising instructions for:
representing a plurality of objects in the object-oriented environment in a directed graph, the plurality of objects including the candidate object;
determining a cyclic value indicative of a number of cyclic paths in the directed graph that include the candidate object, wherein a cyclic path is a strongly connected component such that no node within the strongly connected component has an external reference and no node within the strongly connected component is reachable from an object having an external reference;
controlling disposition of the candidate object using the cyclic value;
storing the cyclic value for the candidate object;
identifying whether a reference to the candidate object has been created or destroyed and whether a path that includes the candidate object has been altered since the storing of the cyclic value; and
subsequently controlling disposition of the candidate object based on the identifying.

2. The medium of claim 1 wherein the identifying indicates that the reference to the candidate object has not been created or destroyed and that the path that includes the candidate object has not been altered since the storing of the cyclic value and wherein the instructions further comprise instructions for:
controlling disposition of the candidate object using the stored cyclic value.

3. The medium of claim 2 wherein the instructions further comprise instructions for:
calculating an acyclic value indicative of a number of acyclic paths that include the candidate object, the calculating using the stored cyclic value and an internal reference value representing a number of internal references to the candidate object, wherein an internal reference is a reference to the candidate object by another object.

4. The medium of claim 1 wherein the identifying indicates that the reference to the candidate object has been created or destroyed since the storing of the cyclic value and wherein the instructions further comprise instructions for:
recalculating the cyclic value based on the identifying; and
controlling disposition of the candidate object using the recalculated cyclic value.

5. The medium of claim 1 wherein the identifying indicates that the path that includes the candidate object has been altered since the storing of the cyclic value and wherein the instructions further comprise instructions for:
recalculating the cyclic value based on the identifying; and
controlling disposition of the candidate object using the recalculated cyclic value.

6. A computer readable medium holding computer-executable instructions that when executed on a processor control disposition of an object in an object-oriented environment, the instructions comprising instructions for:

representing a plurality of objects in the object-oriented environment in a directed graph, the plurality of objects including a candidate object;

calculating a cyclic value indicative of a number of cyclic paths that include an object reachable from the candidate object while calculating a cyclic value for the candidate object, wherein a cyclic path is a strongly connected component such that no node within the strongly connected component has an external reference and no node within the strongly connected component is reachable from an object having an external reference;

controlling disposition of the object reachable from the candidate object using the cyclic value for the object reachable from the candidate object;

storing the cyclic value for the object reachable from the candidate object;

identifying whether a reference to the object reachable from the candidate object has been created or destroyed and whether a path that includes the object reachable from the candidate object has been altered since the storing of the cyclic value for the object reachable from the candidate object; and subsequently controlling disposition of the object reachable from the candidate object based on the identifying.

7. The medium of claim 6 wherein the identifying indicates that the reference to the object reachable from the candidate object has not been created or destroyed and that the path that includes the object reachable from the candidate object has not been altered since the storing of the cyclic value for the object reachable from the candidate object and wherein the instructions further comprise instructions for:

controlling disposition of the object reachable from the candidate object using the stored cyclic value for the object reachable from the candidate object.

8. The medium of claim 7 wherein the instructions further comprise instructions for:

calculating an acyclic value indicative of a number of acyclic paths that include the object reachable from the candidate object, the calculating using the stored cyclic value and an internal reference value representing a number of internal references to the candidate object, wherein an internal reference is a reference to the candidate object by another object.

9. The medium of claim 6 wherein the identifying indicates that the reference to the object reachable from the candidate object has been created or destroyed since the storing of the cyclic value for the object reachable from the candidate object and wherein the instructions further comprise instructions for:

recalculating the cyclic value for the object reachable from the candidate object based on the identifying; and controlling disposition of the object reachable from the candidate object using the recalculated cyclic value.

10. The medium of claim 6 wherein the identifying indicates that that the path that includes the object reachable from the candidate object has been altered since the storing of the cyclic value for the object reachable from the candidate object and wherein the instructions further comprise instructions for:

recalculating the cyclic value for the object reachable from the candidate object based on the identifying; and controlling disposition of the object reachable from the candidate object using the recalculated cyclic value.

11. A computer readable medium holding computer-executable instructions that when executed on a processor control disposition of a candidate object in an object-oriented environment, the instructions comprising instructions for:

representing a plurality of objects in the object-oriented environment in a directed graph, the plurality of objects including the candidate object;

determining a cyclic value indicative of a number of cyclic paths that include the candidate object, wherein a cyclic path is a strongly connected component such that no node within the strongly connected component has an external reference and no node within the strongly connected component is reachable from an object having an external reference;

calculating an acyclic value indicative of a number of acyclic paths that include the candidate object, the calculating using the cyclic value and an internal reference value representing a number of internal references to the candidate object, wherein an internal reference is a reference to the candidate object by another object;

controlling disposition of the candidate object using the cyclic value;

storing the acyclic value for the candidate object;

identifying whether a reference to the candidate object has been created or destroyed and whether a path that includes the candidate object has been altered since the storing of the acyclic value; and subsequently controlling disposition of the candidate object based on the identifying.

12. The medium of claim 11 wherein the identifying indicates that the reference to the candidate object has not been created or destroyed and that the path that includes the candidate object has not been altered since the storing of the acyclic value and wherein the instructions further comprise instructions for:

controlling disposition of the candidate object using the stored acyclic value.

13. A computer-implemented method for controlling disposition of a candidate object in an object-oriented environment, comprising:

representing a plurality of objects in the object-oriented environment in a directed graph, the plurality of objects including the candidate object;

determining a cyclic value indicative of a number of cyclic paths that include the candidate object, wherein a cyclic path is a strongly connected component such that no node within the strongly connected component has an external reference and no node within the strongly connected component is reachable from an object having an external reference;

controlling disposition of the candidate object using the cyclic value;

storing the cyclic value for the candidate object;

identifying whether a reference to the candidate object has been created or destroyed and whether a path that includes the candidate object has been altered since the storing of the cyclic value; and controlling subsequently disposition of the candidate object based on the identifying.

14. The method of claim 13 wherein the identifying indicates that the reference to the candidate object has not been created or destroyed and that the path that includes the candidate object has not been altered since the storing of the cyclic value, and wherein the method further comprises:

controlling disposition of the candidate object using the stored cyclic value.

15. The method of claim 14, further comprising:

calculating an acyclic value indicative of a number of acyclic paths that include the candidate object, the calculating using the stored cyclic value and an internal reference value representing a number of internal references to the candidate object, wherein an internal reference is a reference to the candidate object by another object.

16. The method of claim 13 wherein the identifying indicates that the reference to the candidate object has been created or destroyed since the storing of the cyclic value and wherein the method further comprises:
recalculating the cyclic value based on the identifying; and
controlling disposition of the candidate object using the recalculated cyclic value.

17. The method of claim 13 wherein the identifying indicates that that the path that includes the candidate object has been altered since the storing of the cyclic value and wherein the method further comprises:
recalculating the cyclic value based on the identifying; and
controlling disposition of the candidate object using the recalculated cyclic value.

18. A computer-implemented method for controlling disposition of an object in an object-oriented environment, comprising:
representing a plurality of objects in the object-oriented environment in a directed graph, the plurality of objects including a candidate object;
calculating a cyclic value indicative of a number of cyclic paths that include an object reachable from the candidate object while calculating a cyclic value for the candidate object, wherein a cyclic path is a strongly connected component such that no node within the strongly connected component has an external reference and no node within the strongly connected component is reachable from an object having an external reference;
controlling disposition of the object reachable from the candidate object using the cyclic value for the object reachable from the candidate object;
storing the cyclic value for the object reachable from the candidate object;
identifying whether a reference to the object reachable from the candidate object has been created or destroyed and whether a path that includes the object reachable from the candidate object has been altered since the storing of the cyclic value for the object reachable from the candidate object; and
controlling subsequently disposition of the object reachable from the candidate object based on the identifying.

19. The method of claim 18 wherein the identifying indicates that the reference to the object reachable from the candidate object has not been created or destroyed and that the path that includes the object reachable from the candidate object has not been altered since the storing of the cyclic value for the object reachable from the candidate object and wherein the method further comprises:
controlling disposition of the object reachable from the candidate object using the stored cyclic value for the object reachable from the candidate object.

20. The method of claim 19, further comprising:
calculating an acyclic value indicative of a number of acyclic paths that include the object reachable from the candidate object, the calculating using the stored cyclic value and an internal reference value representing a number of internal references to the candidate object, wherein an internal reference is a reference to the candidate object by another object.

21. A computer-implemented method for controlling disposition of a candidate object in an object-oriented environment, comprising:
representing a plurality of objects in the object-oriented environment in a directed graph, the plurality of objects including the candidate object;
determining a cyclic value indicative of a number of cyclic paths that include the candidate object, wherein a cyclic path is a strongly connected component such that no node within the strongly connected component has an external reference and no node within the strongly connected component is reachable from an object having an external reference;
calculating an acyclic value indicative of a number of acyclic paths that include the candidate object, the calculating using the cyclic value and an internal reference value representing a number of internal references to the candidate object, wherein an internal reference is a reference to the candidate object by another object;
controlling disposition of the candidate object using the cyclic value;
storing the acyclic value for the candidate object; and
identifying whether a reference to the candidate object has been created or destroyed and whether a path that includes the candidate object has been altered since the storing of the acyclic value; and
subsequently controlling disposition of the candidate object based on the identifying.

22. The method of claim 21 wherein the identifying indicates that the reference to the candidate object has not been created or destroyed and that the path that includes the candidate object has not been altered since the storing of the acyclic value and wherein the method further comprises:
controlling disposition of the candidate object using the stored acyclic value.

23. A system having a processor for controlling disposition of an object in an object-oriented environment, comprising:
means for representing a plurality of objects in the object-oriented environment in a directed graph, the plurality of objects including a candidate object;
means for determining a cyclic value indicative of a number of cyclic paths that include the candidate object, wherein a cyclic path is a strongly connected component such that no node within the strongly connected component has an external reference and no node within the strongly connected component is reachable from an object having an external reference;
means for controlling disposition of the candidate object using the cyclic value;
means for storing the cyclic value for the candidate object;
means for identifying whether a reference to the candidate object has been created or destroyed and whether a path that includes the candidate object has been altered since the storing of the cyclic value; and
means for subsequently controlling disposition of the candidate object based on the identifying, the disposition using the stored cyclic value.

* * * * *

UNITED STATES PATENT AND TRADEMARK OFFICE
CERTIFICATE OF CORRECTION

PATENT NO.       : 8,056,055 B1                                   Page 1 of 1
APPLICATION NO.  : 12/135403
DATED            : November 8, 2011
INVENTOR(S)      : David A. Foti It is certified that error appears in the above-identified patent and that said Letters Patent is hereby corrected as shown below:

At column 15, line 57 (claim) of the printed patent, please delete "that" before the.

At column 17, line 13 (claim) of the printed patent, please delete "that" before the.

Signed and Sealed this
Eighth Day of May, 2012

David J. Kappos
*Director of the United States Patent and Trademark Office*